United States Patent
Vyas et al.

(10) Patent No.: US 8,936,276 B1
(45) Date of Patent: Jan. 20, 2015

(54) AUTOMOTIVE FRAME RAIL DESIGN TO MANAGE AN OFFSET, FRONTAL APPLIED LOAD

(71) Applicant: GM Global Technology Operations LLC, Detroit, MI (US)

(72) Inventors: Rajan V. Vyas, Troy, MI (US); Bhushan W. Dandekar, Rochester Hills, MI (US); Darek G. Villeneuve, Clarkston, MI (US); Marcel R. Cannon, Romeo, MI (US); Young Doe, Macomb, MI (US); Krishnarao V. Yalamanchili, Ann Arbor, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 14/133,767

(22) Filed: Dec. 19, 2013

(51) Int. Cl.
*B62D 21/02* (2006.01)
*B62D 21/15* (2006.01)

(52) U.S. Cl.
CPC .................................. *B62D 21/152* (2013.01)
USPC ...... 280/784; 180/232; 180/274; 296/187.09; 296/193.09; 296/203.02

(58) Field of Classification Search
CPC .... B62D 25/082; B62D 25/084; B62D 21/15; B62D 21/152; B62D 21/155; B60K 2021/0004
USPC .............. 280/784; 180/232, 274; 296/187.09, 296/193.09, 203.02
See application file for complete search history.

(56) References Cited

U.S. PATENT DOCUMENTS

| | | | | |
|---|---|---|---|---|
| 2,954,835 | A * | 10/1960 | Janeway | 180/353 |
| 3,520,550 | A * | 7/1970 | Dysarz | 180/312 |
| 6,406,088 | B1 * | 6/2002 | Tate | 296/187.03 |
| 8,480,130 | B2 * | 7/2013 | Dandekar et al. | 280/784 |
| 2005/0189788 | A1 * | 9/2005 | Cornell et al. | 296/187.09 |
| 2010/0026047 | A1 * | 2/2010 | Baccouche et al. | 296/187.09 |
| 2011/0241385 | A1 * | 10/2011 | Baccouche et al. | 296/203.02 |
| 2013/0088049 | A1 * | 4/2013 | Mazur et al. | 296/204 |

* cited by examiner

*Primary Examiner* — Ruth Ilan
*Assistant Examiner* — Darlene P Condra
(74) *Attorney, Agent, or Firm* — Quinn Law Group, PLLC

(57) ABSTRACT

A body structure of a vehicle includes a bulkhead, and a frame rail extending forward from the bulkhead along a longitudinal centerline. A powertrain system is disposed laterally inboard of the frame rail relative to the longitudinal centerline. The frame rail includes a flared section, a splayed section, and a reinforcing member. The flared section curves laterally outboard, away from the longitudinal centerline. The splayed section includes a variable cross sectional area that increases with an increase in distance from the bulkhead. The reinforcing member is operable to increase lateral stiffness in the frame rail, in a direction transverse to the longitudinal centerline. The frame rail is operable to deform into contact with the powertrain system in response to a load applied to a forward end of the body structure and laterally offset from the longitudinal centerline, to generate a lateral force in the body structure.

20 Claims, 3 Drawing Sheets

AUTOMOTIVE FRAME RAIL DESIGN TO MANAGE AN OFFSET, FRONTAL APPLIED LOAD

TECHNICAL FIELD

The invention generally relates to a frame rail of a vehicle's body structure.

BACKGROUND

Vehicles include some form of a body structure, which often includes a pair of laterally offset frame rails that extend forward from a bulkhead. A bumper structure, including a load bearing beam, may be attached to a forward end of the frame rails. In the event of an offset frontal applied load, in which a load is applied to a forward corner of the vehicle, the applied load may be transmitted or transferred to the adjacent frame rail.

SUMMARY

A vehicle is provided. The vehicle includes a body structure having a bulkhead, and a frame rail extending forward from the bulkhead along a longitudinal centerline of the body structure. A powertrain system is supported by and attached to the body structure. The powertrain system is disposed laterally inboard of the frame rail relative to the longitudinal centerline. The frame rail includes a flared section and a splayed section. The flared section curves laterally outboard, away from the longitudinal centerline. The splayed section includes a variable cross sectional area that increases with an increase in distance from the bulkhead. The frame rail further includes at least one reinforcing member. The reinforcing member is operable to increase lateral stiffness in the frame rail, in a direction transverse to the longitudinal centerline. The frame rail is operable to deform into contact with the powertrain system in response to a load applied to a forward end of the body structure and laterally offset from the longitudinal centerline, to generate a lateral force in the body structure.

A body structure of a vehicle is also provided. The body structure includes a bulkhead, a first frame rail and a second frame rail. The first frame rail and the second frame rail extend forward from the bulkhead along a longitudinal centerline. The first frame rail and the second frame rail are disposed on opposing lateral sides of the longitudinal centerline. Each of the first frame rail and the second frame rail includes a flared section, a splayed section, and at least one reinforcing member. The flared section of each of the first frame rail and the second frame rail curves laterally outboard, away from the longitudinal centerline. The splayed section of each of the first frame rail and the second frame rail includes a variable cross sectional area that increases with an increase in distance from the bulkhead. The reinforcing member of each of the first frame rail and the second frame rail is operable to increase lateral stiffness of their respective frame rail, in a direction transverse to the longitudinal centerline. Each of the first frame rail and the second frame rail are operable to deform into contact with a powertrain system, disposed inboard of and between the first frame rail and the second frame rail, in response to a load applied to a forward end thereof and laterally offset from the longitudinal centerline, to generate a lateral force.

Accordingly, the frame rails of the body structure are configured to kinematically manage a load applied to a forward corner of the vehicle. In response to an applied load being applied by an object to the forward end of the body structure, and laterally offset from the longitudinal centerline of the body structure, the frame rails are configured to deform laterally inward, transverse to the longitudinal centerline of the body structure, into engagement with a rigid component of the vehicle, such as a vehicle powertrain system, to enhance lateral acceleration of the body structure away from the object.

The above features and advantages and other features and advantages of the present invention are readily apparent from the following detailed description of the best modes for carrying out the invention when taken in connection with the accompanying drawings.

DETAILED DESCRIPTION

Those having ordinary skill in the art will recognize that terms such as "above," "below," "upward," "downward," "top," "bottom," etc., are used descriptively for the figures, and do not represent limitations on the scope of the invention, as defined by the appended claims. Furthermore, the invention may be described herein in terms of functional and/or logical block components and/or various processing steps. It should be realized that such block components may be comprised of any number of hardware, software, and/or firmware components configured to perform the specified functions.

Figure 1:
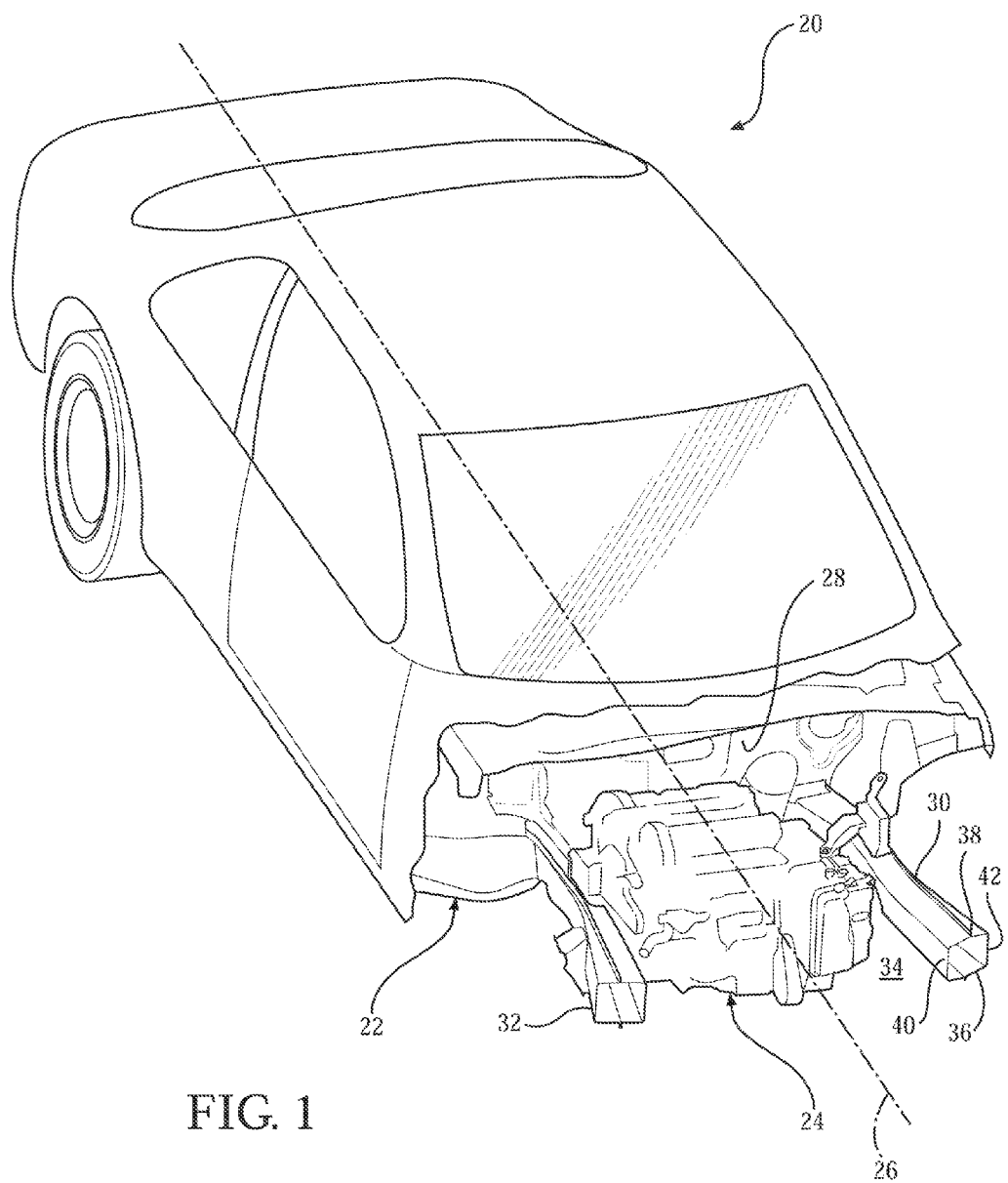
FIG. 1 is a schematic perspective view of a body structure of a vehicle.

Referring to the Figures, wherein like numerals indicate like parts throughout the several views, a vehicle is generally shown at 20 in FIG. 1. The vehicle 20 may include any shape, size, and/or style of vehicle 20 that includes a body structure 22, such as but not limited to a sedan, a sport utility vehicle 20, a truck, van, etc.

Referring to FIG. 1, the body structure 22 of the vehicle 20 supports the various components of the vehicle 20, such as but not limited to a powertrain system 24 (i.e., a drivetrain), wheels, axles, body panels, etc. The body structure 22 includes a forward end and a rearward end. The rearward end is spaced from the forward end along a longitudinal axis. The longitudinal axis extends along a longitudinal centerline 26 of the body structure 22. While the body structure 22 is shown schematically in the Figures as a unibody structure 22, it should be appreciated that the body structure 22 may be configured differently than shown in the Figures, such as but not limited to a traditional body on frame structure. The body structure 22 includes a bulkhead 28. A first frame rail 30 and a second frame rail 32 extend forward from the bulkhead 28, along the longitudinal centerline 26 of the body structure 22. The first frame rail 30 and the second frame rail 32 may alternatively be described as a first motor rail and a second motor rail respectively. The first frame rail 30 is laterally offset from the second frame rail 32 on opposing lateral sides of the longitudinal centerline 26.

The powertrain system 24 supported by and attached to the body structure 22. The powertrain system 24 is disposed forward of the bulkhead 28, and laterally inboard of the first frame rail 30 and the second frame rail 32 relative to the longitudinal centerline 26 of the body structure 22. As used herein, the term inboard refers to a location relative to the longitudinal centerline 26 of the body structure 22. Accordingly, an inboard feature is located nearer or closer to the longitudinal centerline 26 of the body structure 22 than an outboard feature. The powertrain system 24 may include, but is not limited to, an internal combustion engine, an electric motor, a transmission, a transaxle, or a combination thereof. The components of the powertrain system 24 are rigidly mounted to the body structure 22, such as but not limited to the first frame rail 30 and/or the second frame rail 32.

Figure 2:
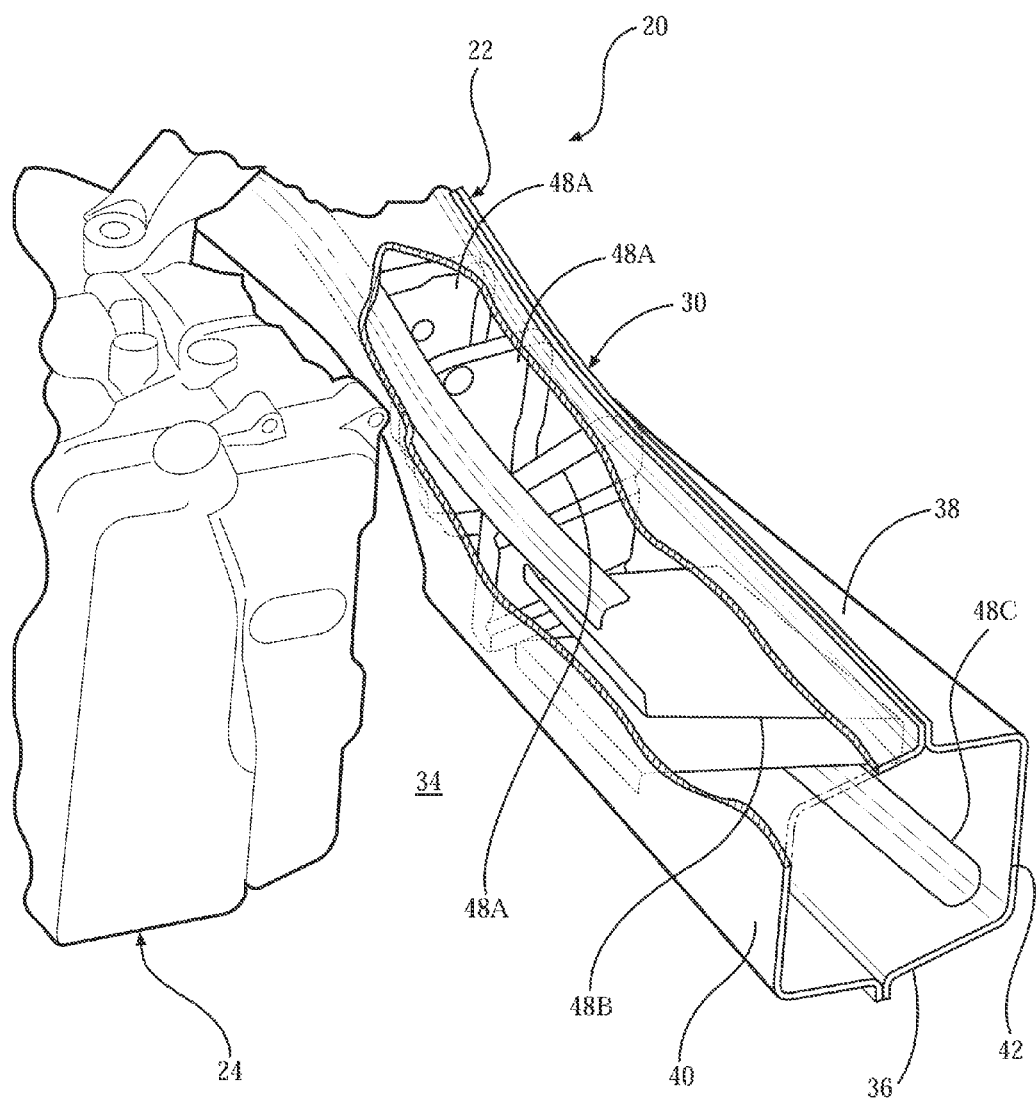
FIG. 2 is a schematic fragmentary perspective view of the first frame rail.

Referring to FIG. 2, each of the first frame rail 30 and the second frame rail 32 include a tubular structure defining an interior region 34. Each of the first frame rail 30 and the second frame rail 32 includes a lower wall 36, an upper wall 38, an inboard wall 40, and an outboard wall 42. The lower wall 36 and the upper wall 38 are disposed opposite each other, and are vertically spaced from each other. The inboard wall 40 and the outboard wall 42 are disposed opposite each other, and are laterally spaced from each other. The lower wall 36, the upper wall 38, the inboard wall 40, and the outboard wall 42, of the first frame rail 30 and the second frame rail 32 respectively, cooperate to define the tubular structure of the first frame rail 30 and the second frame respectively.

Figure 3:
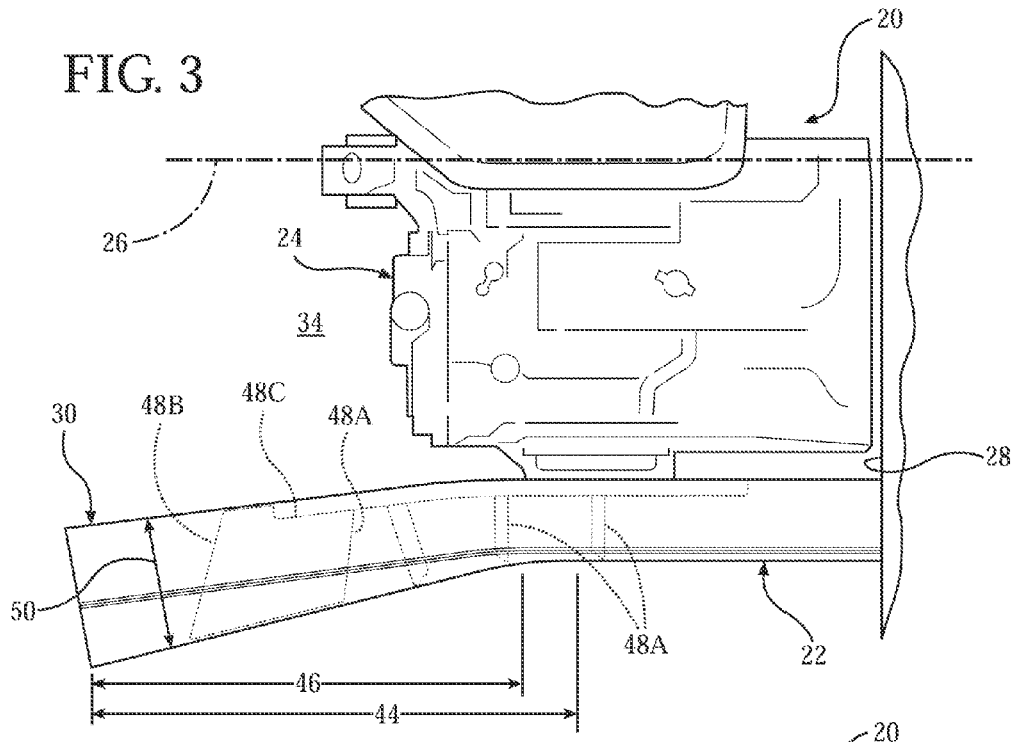
FIG. 3 is a schematic fragmentary plan view of the body structure showing a first frame rail prior to a frontal, offset loading event.

Referring to FIG. 3, the first frame rail 30 is shown having a flared section 44, a splayed section 46, and at least one reinforcing member 48. While FIG. 3 only shows the first frame rail 30, it should be appreciated that the second frame rail 32 is constructed in the same manner as the first frame rail 30, and is substantially a mirror image of the first frame rail 30. Accordingly, the second frame rail 32 is not shown in detail. However, the written description of the first frame rail 30 and the embodiment of the first frame rail 30 shown in FIG. 3 are applicable to the second frame rail 32. Preferably, the flared section 44, the splayed section 46, and the reinforcing member(s) 48 of each of the first frame rail 30 and the second frame rail 32 at least partially overlap each other along the longitudinal centerline 26.

As best shown in FIG. 3, the flared section 44 of the first frame rail 30 curves laterally outboard, away from the longitudinal centerline 26, as the distance from the bulkhead 28 increases. Accordingly, within the flared section 44 of the first frame rail 30, as the distance from the bulkhead 28 increases, the distance between the longitudinal centerline 26 of the body structure 22 and the first frame rail 30 increases. The flared section 44 of the first frame rail 30 need not include the entire portion of the first frame rail 30 located forward of the bulkhead 28. As such, a portion of the first frame rail 30, disposed forward of the bulkhead 28, may be disposed substantially parallel with the longitudinal centerline 26 of the body structure 22, or may curve or bend inward toward the longitudinal centerline 26. However, as noted above, the flared section 44 of the first frame rail 30 curves laterally outboard relative to the longitudinal centerline 26.

The flared section 44 of the first frame rail 30 may define a curve having a radius between the range of 0.2 m and 0.4 m, with a center located outboard of the first frame rail 30. Alternatively, the flared section 44 may be angularly bent relative to other portions of the first frame rail 30. For example, the flared section 44 may form an angle between the range of 165° and 170° relative to an adjacent portion of the first frame rail 30.

The splayed section 46 of the first frame rail 30 includes a variable cross sectional area, which increases with an increase in distance from the bulkhead 28. Accordingly, within the splayed section 46 of the first frame rail 30, as the distance from the bulkhead 28 increases, the cross sectional area of the first frame rail 30, measured substantially perpendicular relative to the longitudinal centerline 26, increases. The splayed section 46 of the first frame rail 30 need not include the entire portion of the first frame rail 30 located forward of the bulkhead 28. As such, a portion of the first frame rail 30, disposed forward of the bulkhead 28, may include a substantially constant cross sectional area, or the cross sectional area may decrease with an increase in distance from the bulkhead 28. However, as noted above, the splayed section 46 of the first frame rail 30 includes a cross sectional area that increases as the distance from the bulkhead 28 increases.

Within the splayed section 46 of the first frame rail 30, the upper wall 38 and the lower wall 36 increase in width 50 as the distance from the bulkhead 28 increases. The width 50 is the distance between the inboard wall 40 and the outboard wall 42. The increased width 50 of the upper wall 38 and the lower wall 36, while a height of the inboard wall 40 and the outboard wall 42 remains constant or increases, provides the increase in the cross sectional area of the first frame rail 30. The height of the inboard wall 40 and the outboard wall 42 is the distance between the upper wall 38 and the lower wall 36. The width 50 of the upper wall 38 and the lower wall 36 is measured substantially perpendicular to the longitudinal centerline 26. The variable cross sectional area of the splayed section 46 of the first frame rail 30 may increase by at least 60% between a rearward end of the frame rail disposed adjacent the bulkhead 28, and a forward end of the frame rail spaced from the bulkhead 28 along the longitudinal centerline 26 of the body structure 22.

As noted above, each of the first frame rail 30 and the second frame rail 32 include at least one reinforcing member 48. Preferably, and as shown in FIG. 2 with reference to the first frame rail 30, each of the first frame rail 30 and the second frame rail 32 include multiple reinforcing members 48. The reinforcing members 48 are referred to generally within the written specification with the reference numeral 48, and specifically within the specification and in the Figures by reference numerals 48A, 48B, and 48C. The reinforcing members 48 of the respective frame rails are operable to increase lateral stiffness in the respective frame rails, in a direction transverse to the longitudinal centerline 26.

Preferably, the reinforcing members 48 are disposed within the interior region 34 of the respective first frame rail 30 and second frame rail 32. However, it should be appreciated that the reinforcing members 48 may be attached to an exterior of their respective frame rail. The reinforcing members 48 may include any structural feature that increases the lateral stiffness of the frame rails. For example, the reinforcing members 48 may include a plate extending between the inboard wall 40 and the outboard wall 42. The plate may be orientated vertically and transverse relative to the longitudinal centerline 26, such as shown by a first reinforcing member 48A. Alternatively, the plate may be orientated horizontally and substantially parallel with the longitudinal centerline 26, such as shown by a second reinforcing member 48B. As shown in FIG. 2, the second reinforcing member 48B includes a channel structure, with the opposing plates spanning between the inboard wall 40 and the outboard wall 42 of the first frame rail 30. Additionally, the reinforcing member 48 may include a corner brace that is disposed at an intersection of one of the upper wall 38 or the lower wall 36, with one of the inboard wall 40 or the outboard wall 42, such as shown by a third reinforcing member 48C.

Because of the flared section 44, the splayed section 46, and the reinforcing members 48 of each of the first frame rail 30 and the second frame rail 32, the first frame rail 30 and the second frame rail 32 are operable to deform laterally inboard, into contact with the powertrain system 24, in response to a load 52 applied by an object 54 to a forward corner of the body structure 22, i.e., to a load 52 applied to a forward end of one of the first frame rail 30 and the second frame rail 32, and laterally offset from the longitudinal centerline 26. The first frame rail 30 and the second frame rail 32 are configured to deform into contact with the powertrain system 24, in response to the frontal, offset applied load 52, in order to generate a lateral force and increase lateral acceleration away from the object 54. Additionally, the controlled deformation of the first frame rail 30 or the second frame rail 32, in response to a frontal, offset applied load 52, absorbs some of the load 52.

Figure 4:
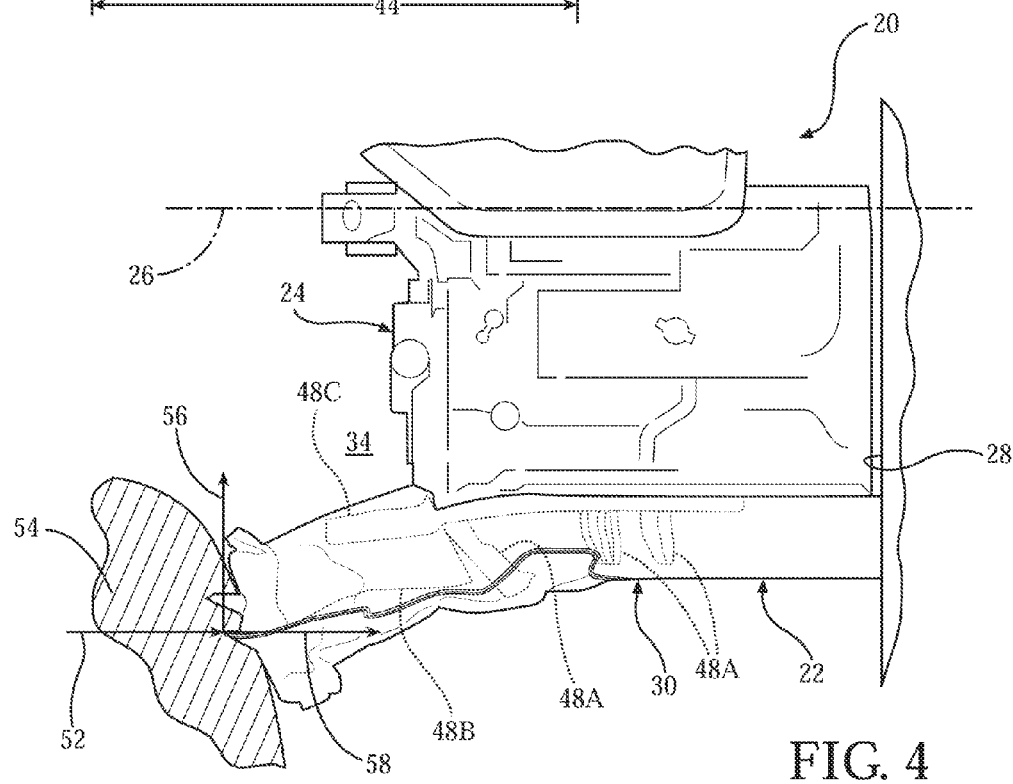
FIG. 4 is an enlarged schematic fragmentary plan view of the frame rail showing force distribution during a frontal, offset loading event.

Referring to FIG. 4, in the event of the laterally offset applied load 52, in which a forward corner of the vehicle 20 contacts the object 54, the first frame rail 30 and the second frame rail 32 are operable to transfer a lateral component 56 of the applied load 52 to the powertrain system 24. A longitudinal component 58 of the applied load 52 may be transferred to the respective frame rail, or may be absorbed by the respective frame rail during deformation thereof. Because the powertrain system 24 is rigidly attached to the body structure 22, transferring the lateral component 56 of the applied load 52 laterally to the powertrain system 24 increases lateral acceleration of the vehicle 20, away from the object 54. While FIG. 4 only shows the first frame rail 30 and the force distribution therefore, it should be appreciated that the second frame rail 32 operates in a similar fashion on the opposing lateral side of the vehicle 20. The longitudinal component 58 of the applied load 52 is directed axially along the longitudinal centerline 26 to slow the fore/aft movement of the vehicle 20. The lateral component 56 of the applied load 52 is directed transverse relative to the longitudinal centerline 26, i.e., approximately perpendicular to the longitudinal centerline 26, to force the vehicle 20 away from the object 54.

The detailed description and the drawings or figures are supportive and descriptive of the invention, but the scope of the invention is defined solely by the claims. While some of the best modes and other embodiments for carrying out the claimed invention have been described in detail, various alternative designs and embodiments exist for practicing the invention defined in the appended claims.

The invention claimed is:

1. A vehicle comprising:
 a body structure including a bulkhead, and a frame rail extending forward from the bulkhead along a longitudinal centerline of the body structure; and
 a powertrain system supported by and attached to the body structure, and disposed laterally inboard of the frame rail relative to the longitudinal centerline;
 wherein the frame rail includes:
  a flared section curving laterally outboard, away from the longitudinal centerline;
  a splayed section having a variable cross sectional area that increases with an increase in distance from the bulkhead; and
  at least one reinforcing member operable to increase lateral stiffness in the frame rail, in a direction transverse to the longitudinal centerline;
 wherein the frame rail is operable to deform into contact with the powertrain system in response to a load applied to a forward end of the body structure and laterally offset from the longitudinal centerline, to generate a lateral force in the body structure.

2. A vehicle as set forth in claim 1 wherein the flared section and the splayed section at least partially overlap each other along the longitudinal centerline of the body structure.

3. A vehicle as set forth in claim 1 wherein the flared section of the frame rail defines a radius between the range of 0.2 m and 0.4 m.

4. A vehicle as set forth in claim 1 wherein the variable cross sectional area of the splayed section increases by at least 60% between a rearward end of the frame rail disposed adjacent the bulkhead, and a forward end of the frame rail spaced from the bulkhead along the longitudinal centerline of the body structure.

5. A vehicle as set forth in claim 1 wherein the frame rail includes a lower wall, an upper wall, an inboard wall, and an outboard wall, wherein the lower wall and the upper wall are disposed opposite each other, the inboard wall and the outboard wall are disposed opposite each other, and the lower wall, the upper wall, the inboard wall, and the outboard wall cooperate to define a tubular structure having an open interior region.

6. A vehicle as set forth in claim 5 wherein the upper wall and the lower wall increase in width, measured perpendicular to the longitudinal centerline of the body structure, as the variable cross sectional area of the splayed section increases in area.

7. A vehicle as set forth in claim 5 wherein the at least one reinforcing member is disposed within the interior region of the frame rail.

8. A vehicle as set forth in claim 7 wherein the at least one reinforcing member includes a plate extending between the inboard wall and the outboard wall.

9. A vehicle as set forth in claim 8 wherein the plate is orientated vertically and transverse relative to the longitudinal centerline of the body structure.

10. A vehicle as set forth in claim 8 wherein the plate is orientated horizontally and substantially parallel with the longitudinal centerline of the body structure.

11. A vehicle as set forth in claim 7 wherein the at least one reinforcing member includes a corner brace disposed at an intersection of one of the upper wall or the lower wall, with one of the inboard wall or the outboard wall.

12. A vehicle as set forth in claim 1 wherein the frame rail includes a first frame rail and a second frame rail disposed on opposite lateral sides of the longitudinal centerline of the body structure, with the powertrain system disposed between the first frame rail and the second frame rail.

13. A body structure of a vehicle, the body structure comprising:
 a bulkhead;
 a first frame rail and a second frame rail, each extending forward from the bulkhead along a longitudinal centerline, with the first frame rail and the second frame rail disposed on opposing lateral sides of the longitudinal centerline, wherein each of the first frame rail and the second frame rail includes:
  a flared section curving laterally outboard, away from the longitudinal centerline;
  a splayed section having a variable cross sectional area that increases with an increase in distance from the bulkhead; and
  at least one reinforcing member operable to increase lateral stiffness in the respective frame rail, in a direction transverse to the longitudinal centerline;

wherein each of the first frame rail and the second frame rail are operable to deform into contact with a powertrain system, disposed inboard of and between the first frame rail and the second frame rail, in response to a load applied to a forward end thereof and laterally offset from the longitudinal centerline, to generate a lateral force.

14. A body structure as set forth in claim 13 wherein the flared section and the splayed section of each of the first frame rail and the second frame rail at least partially overlap each other along the longitudinal centerline.

15. A body structure as set forth in claim 13 wherein each of the first frame rail and the second frame rail includes a lower wall, an upper wall, an inboard wall, and an outboard wall, wherein the lower wall and the upper wall are disposed opposite each other, the inboard wall and the outboard wall are disposed opposite each other, and the lower wall, the upper wall, the inboard wall, and the outboard wall cooperate to define a tubular structure having an open interior region.

16. A body structure as set forth in claim 15 wherein the upper wall and the lower wall increase in width, measured perpendicular to the longitudinal centerline, as the variable cross sectional area of the splayed sections of the first frame rail and the second frame rail increases in area.

17. A body structure as set forth in claim 15 wherein the at least one reinforcing member is disposed within the interior region of the respective first frame rail and second frame rail.

18. A body structure as set forth in claim 17 wherein the at least one reinforcing member includes a plate extending between the inboard wall and the outboard wall.

19. A body structure as set forth in claim 18 wherein the plate is orientated vertically and transverse relative to the longitudinal centerline.

20. A body structure as set forth in claim 18 wherein the plate is orientated horizontally and substantially parallel with the longitudinal centerline.

* * * * *